(12) United States Patent
Yu

(10) Patent No.: US 7,898,616 B2
(45) Date of Patent: Mar. 1, 2011

(54) BACK PLATE OF BACKLIGHT MODULE AND MANUFACTURING METHOD THEREOF

(75) Inventor: Chia-Hsin Yu, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 17 days.

(21) Appl. No.: 12/204,243

(22) Filed: Sep. 4, 2008

(65) Prior Publication Data

US 2009/0108721 A1 Apr. 30, 2009

(30) Foreign Application Priority Data

Oct. 31, 2007 (TW) .............................. 96141042 A

(51) Int. Cl.
- *G02F 1/1335* (2006.01)
- *A47B 81/00* (2006.01)
- *G09G 3/36* (2006.01)
- *B21D 31/00* (2006.01)

(52) U.S. Cl. ........ 349/65; 312/223.5; 345/102; 72/379.2

(58) Field of Classification Search .................... 349/65; 312/223.5; 345/102; 72/379.2
See application file for complete search history.

(56) References Cited

U.S. PATENT DOCUMENTS

| 7,167,365 B2 * | 1/2007 | Fu et al. .................. 361/697 |
| 7,172,329 B2 * | 2/2007 | Kao et al. .................. 362/633 |

| 2004/0170009 A1 | 9/2004 | Ho |
| 2007/0046859 A1 * | 3/2007 | Huang et al. ..................... 349/65 |
| 2007/0172193 A1 * | 7/2007 | Chang ........................... 385/147 |

FOREIGN PATENT DOCUMENTS

| CN | 2079603 | 6/1991 |
| CN | 1538218 | 10/2004 |
| CN | 101030000 | 9/2007 |
| TW | 2005 23632 | 7/2005 |
| TW | 2007 14979 | 4/2007 |
| TW | M311046 | 5/2007 |
| TW | I287153 | 9/2007 |
| TW | I287678 | 10/2007 |
| WO | WO 2007-037038 | 4/2007 |

OTHER PUBLICATIONS

English language translation of abstract of WO 2007-037038.
English language translation of abstract of CN 1538218.
English language translation of abstract and pertinent parts of CN 2079603.
English language translation of abstract of TW 2005 23632.
English language translation of abstract of TW 2007 14979.
English language translation of abstract of CN 101030000 (published Sep. 5, 2007).
Taiwanese language Notice of Allowance dated May 7, 2010.
English language translation of Taiwanese Notice of Allowance.

(Continued)

*Primary Examiner* — Jerry M Blevins
(74) *Attorney, Agent, or Firm* — Thomas, Kayden, Horstemeyer & Risley, LLP

(57) ABSTRACT

A back plate includes an inner part, a bottom part, an outer part, a folded part and a fastener. The bottom part is connected to the inner part for providing a container space. The outer part is opposite the inner part. The folded part is connected with the outer part and the inner part. The fastener is disposed on the outer part. A method for manufacturing the back plate is also disclosed herein.

3 Claims, 7 Drawing Sheets

OTHER PUBLICATIONS

English language translation of abstract of TW M311046 (published May 1, 2007).

English language translation of abstract of TW TW 1287153 (published Sep. 21, 2007).

English language translation of abstract of TW I287678 (published Oct. 1, 2007).

* cited by examiner

BACK PLATE OF BACKLIGHT MODULE AND MANUFACTURING METHOD THEREOF

RELATED APPLICATIONS

This application claims priority to Taiwan Patent Application Serial Number 96141042, filed Oct. 31, 2007, which is herein incorporated by reference.

BACKGROUND

1. Field of Invention

The present invention relates to a backlight module. More particularly, the present invention relates to a structural component of a backlight module.

2. Description of Related Art

A conventional liquid crystal display (LCD) includes a color filter, a backlight module, a driving circuit, an optical film, and a glass substrate. The backlight module is necessary to display image data because liquid crystals do not self-illuminate.

The backlight module includes a back plate and an upper frame. The back plate and the upper frame are coupled together to provide a container space. The container has a space to contain a light source and an optical component therein. In this way, the light source can be coupled with the LCD to provide light to the display area of the LCD.

The back plate has a hook coupled to the upper frame to fix the upper frame on the back plate and a conventional process to make the hook needs to punch a hole on the back plate. However, this hole may provide a path for dust to penetrate inside the backlight module and the dust inside the backlight module may cause bright/dark spot defects. Furthermore, the dust inside the backlight module may also cause vibration test failure.

Moreover, the light provided by the light source, e.g. a cold cathode fluorescent tube (CCFL), may leak through the hole, and thus the lighting efficiency is decreased by the hole on the back plate.

SUMMARY

According to one embodiment of the present invention, a back plate includes an inner part, a bottom part, an outer part, a folded part and a fastener. The bottom part is connected to the inner part to provide a container space. The outer part is in contact with the inner part. The folded part is connected with the outer part and the inner part. The fastener is disposed on the outer part.

According to another embodiment of the present invention, a backlight module includes a back plate, an upper frame and a light source. The back plate includes an inner part, a bottom part, an outer part, a folded part and a fastener. The bottom part is connected to the inner part to provide a container space. The outer part is opposite the inner part. The folded part is connected with the outer part and the inner part. The fastener is disposed on the outer part. The upper frame is coupled to the fastener. The light source is disposed in the container space.

According to yet another embodiment of the present invention, a method for manufacturing a back plate includes the following steps:

(a) forming a protrusion on the inner surface of a half shell; and (b) folding at least part of the half shell outwards such that the protrusion faces outside of the half shell.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
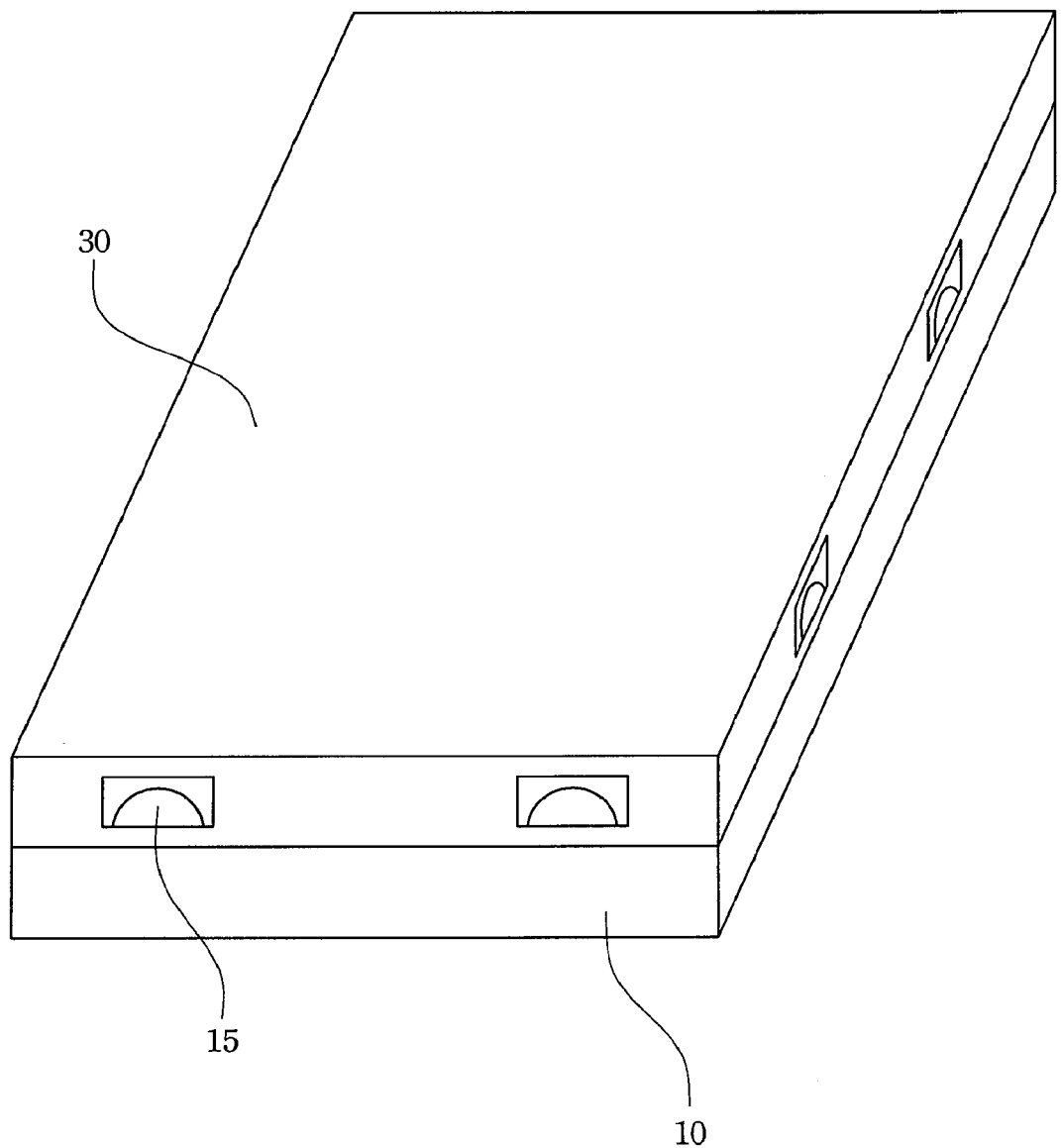
FIG. 1 is a three-dimensional view of a backlight module according to one embodiment of the present invention.

Reference will now be made in detail to the embodiments of the present invention, examples of which are illustrated in the accompanying drawings. Wherever possible, the same reference numbers are used in the drawings and the description to refer to the same or like parts.

FIG. 1 is a three-dimensional view of a backlight module according to one embodiment of the present invention. A backlight module 1 includes a back plate 10 and an upper frame 30. The back plate 10 has at least one fastener 15 disposed thereon. The upper frame 30 is coupled to the fastener 15 of the back plate 10 such that the upper frame 30 can be fixed on the back plate 10.

Figure 2:
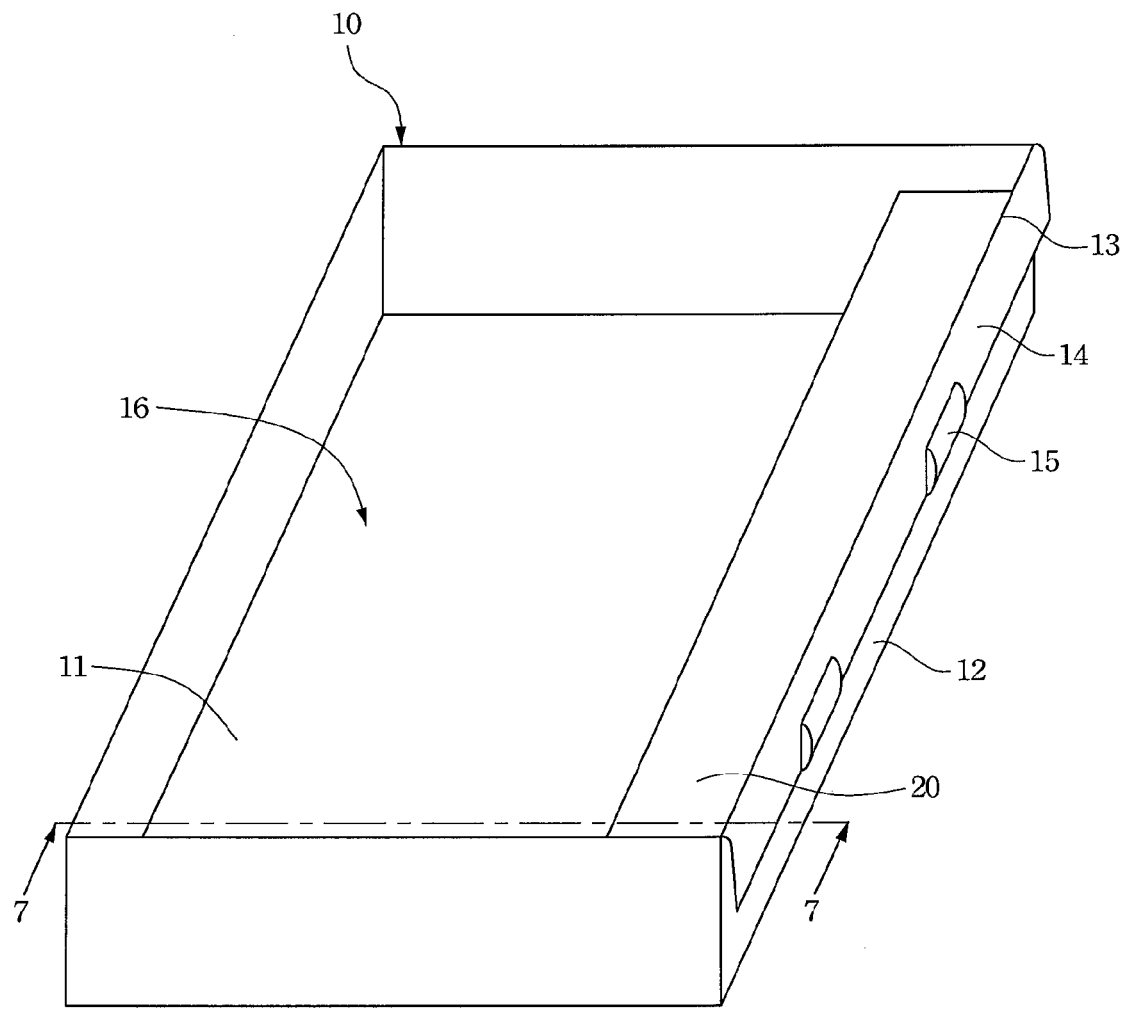
FIG. 2 shows the backlight module of FIG. 1 after its upper frame is removed.

FIG. 2 shows the backlight module 1 of FIG. 1 after its upper frame 30 is removed. The back plate 10 of FIG. 2 further includes an inner part 12, a bottom part 11, an outer part 14 and a folded part 13. The bottom part 11 is connected to the inner part 12 to provide a container space 16. The outer part 14 is opposite the inner part 12. That is, the outer part 14 is disposed outside the container space 16. The folded part 13 is connected with the outer part 14 and the inner part 12. The fastener 15, where the upper frame 30 (shown in FIG. 1) is coupled, is disposed on the outer part 14, and thus the inner surface of the inner part 12, facing the container space 16, is flat without any holes or slits that allow dust to penetrate through. Moreover, the light leakage problem can be solved by the flat inner surface of the inner part 12 as well.

As shown in FIG. 2, the fastener 15 may be formed on the edge of the outer part 14 by mechanical stamping, and thus there is no hole or slit on the outer part 14 that allows dust to penetrate through. Moreover, the light leakage problem can be eliminated by forming the fastener 15 on the edge of the outer part 14 as well.

Figure 3:
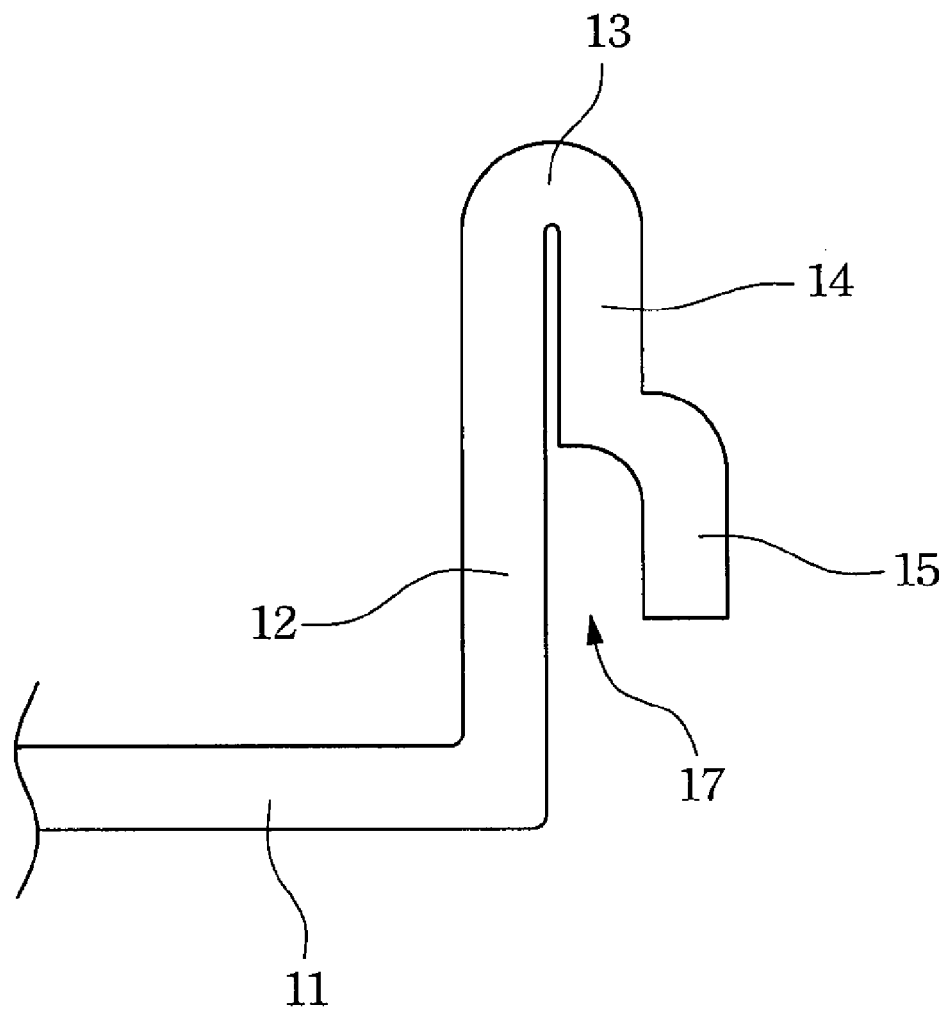
FIG. 3 is a side view of the back plate of FIG. 1.

FIG. 3 is a side view of the back plate 10 of FIG. 1. The fastener 15 may stick out to fasten the upper frame 30 (shown in FIG. 1) and the back plate 10 together. More specifically, the fastener 15 may be a male fastener protruding from the outer surface of the outer part 14, facing away from the inner part 12. Moreover, the fastener 15 may have a concavity 17 disposed in the bottom surface of the fastener 15, facing away from the folded part 13, because the fastener 15 is formed by mechanical stamping. It is easily understood that the shape of the fastener 15 shown in FIG. 3 is only one of the examples. That is, the fastener may permissibly have a different shape than that shown in FIG. 3 within the scope of the invention if its fastening capability is not materially altered.

Figure 4:
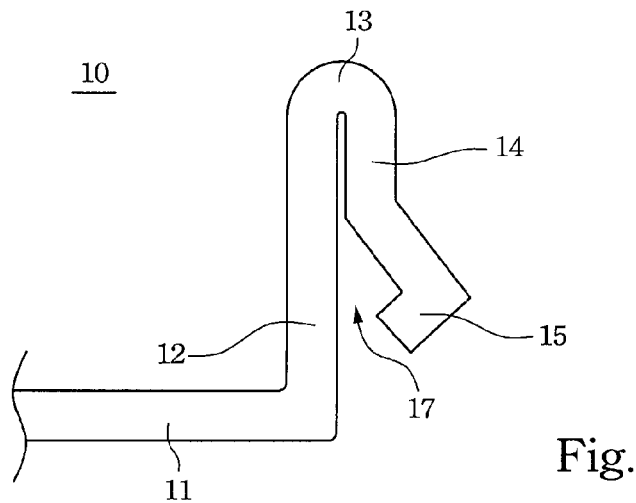
FIG. 4 is a side view of the back plate according to another embodiment of the present invention.

For example, the fastener 15 of FIG. 4 has substantially the same structure as that shown in FIG. 3, i.e. a male fastener with a concavity 17 disposed therein. However, the concavity 17 has a shrink-opening on the bottom surface of the fastener 15.

Figure 5:
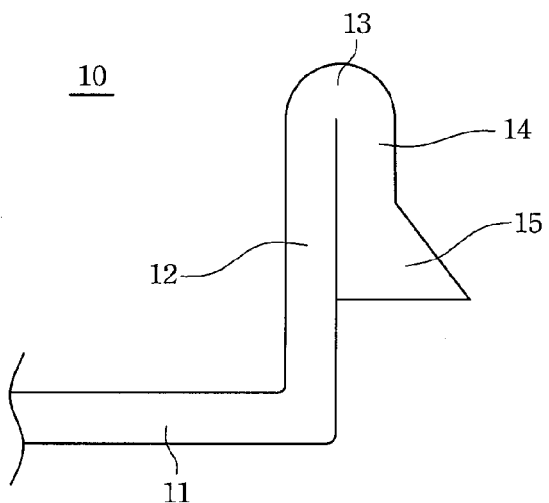
FIG. 5 is a side view of the back plate according to yet another embodiment of the present invention.

Alternatively, the fastener 15 may be a solid male fastener (as shown in FIG. 5). That is, the fastener 15 of FIG. 5 does not have the concavity disposed therein. Accordingly, the fastener 15 can be rugged enough for heavy use. Furthermore, this fastener 15 also leaves no space, i.e. concavity, for dust to settle into.

Figure 6:
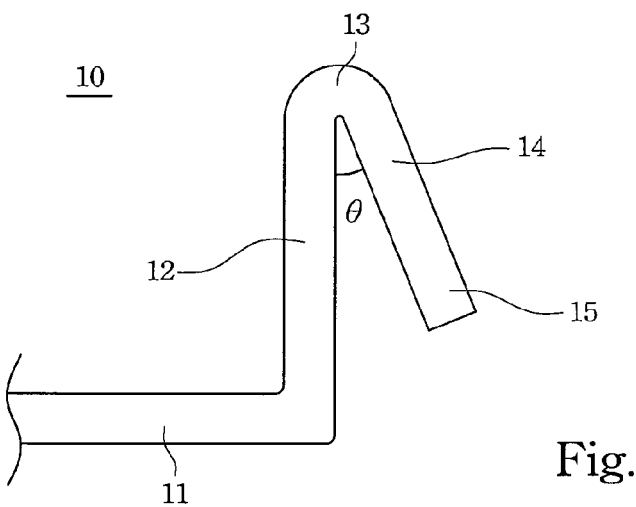
FIG. 6 is a side view of the back plate according to still another embodiment of the present invention.

Although FIG. 3, FIG. 4 and FIG. 5 show the outer part 14 is parallel with the inner part 12 (as shown in FIG. 3 and FIG. 4) or is in contact with the inner part 12 (as shown in FIG. 5), the outer part may not be parallel with the inner part as well. For example, FIG. 6 shows the outer part 14 and the inner part 12 may be at an angle θ to each other. It would be appreciated by a person skilled in the art that the relationship between the outer part and the inner part could permissibly vary within the scope of the invention according to actual requirements.

The inner part 12, the folded part 13 and the outer part 14 of FIG. 3 may be made as one piece. That is, the material of the inner part 12, the material of the folded part 13, and the material of the outer part 14 may be the same. It is easily understood that the relationship among the inner part, the folded part and the outer part could permissibly vary within the scope of the invention. For example, the inner part, the folded part and the outer part may be coupled together according to another embodiment of the present invention.

Furthermore, the inner part 12 and the bottom part 11 of FIG. 3 may be made as one piece as well. That is, the material of the inner part 12 and the material of the bottom part 11 may be the same. In addition, the inner part 12 may be substantially perpendicular to the bottom part 11. Similarly, the relationship between the inner part and the bottom part could permissibly vary within the scope of the invention as well. For example, the inner part and the bottom part may be coupled together according to another embodiment of the present invention.

Figure 7:
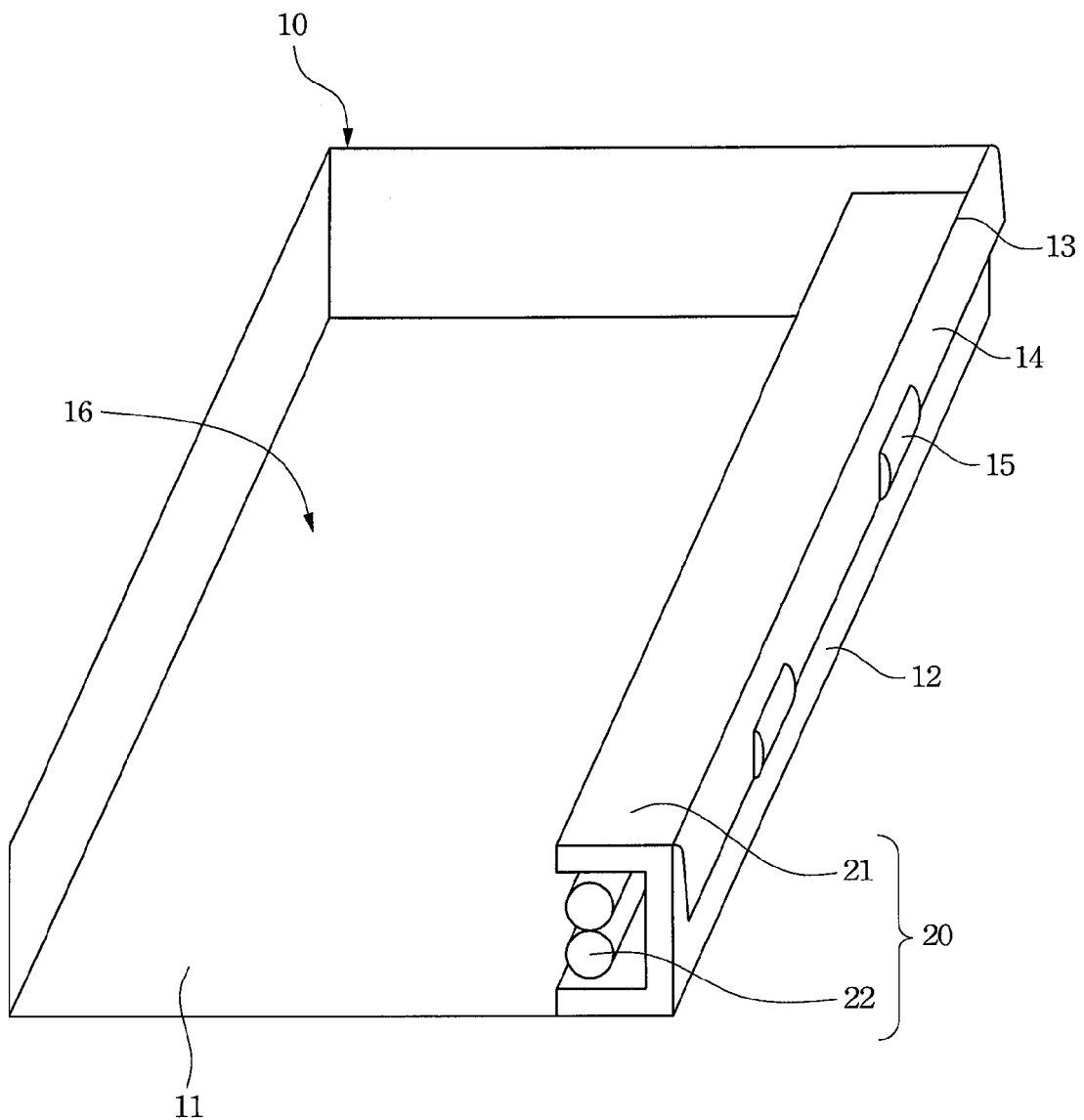
FIG. 7 is a cross-section view taken along line 7-7 of FIG. 2.

FIG. 7 is a cross-section view taken along line 7-7 of FIG. 2. There may be a light source 20 disposed in the container space 16. The light source 20 includes a tube lamp 22 and a reflector 21. The reflector 21 is attached to the inner part 12 of the back plate 10. This reflector 21 may cover at least part of the emitting surface of the tube lamp 22 to reflect the light provided by the tube lamp 22 to the light guide plate (not shown) or the liquid crystals (not shown).

Figure 8A:
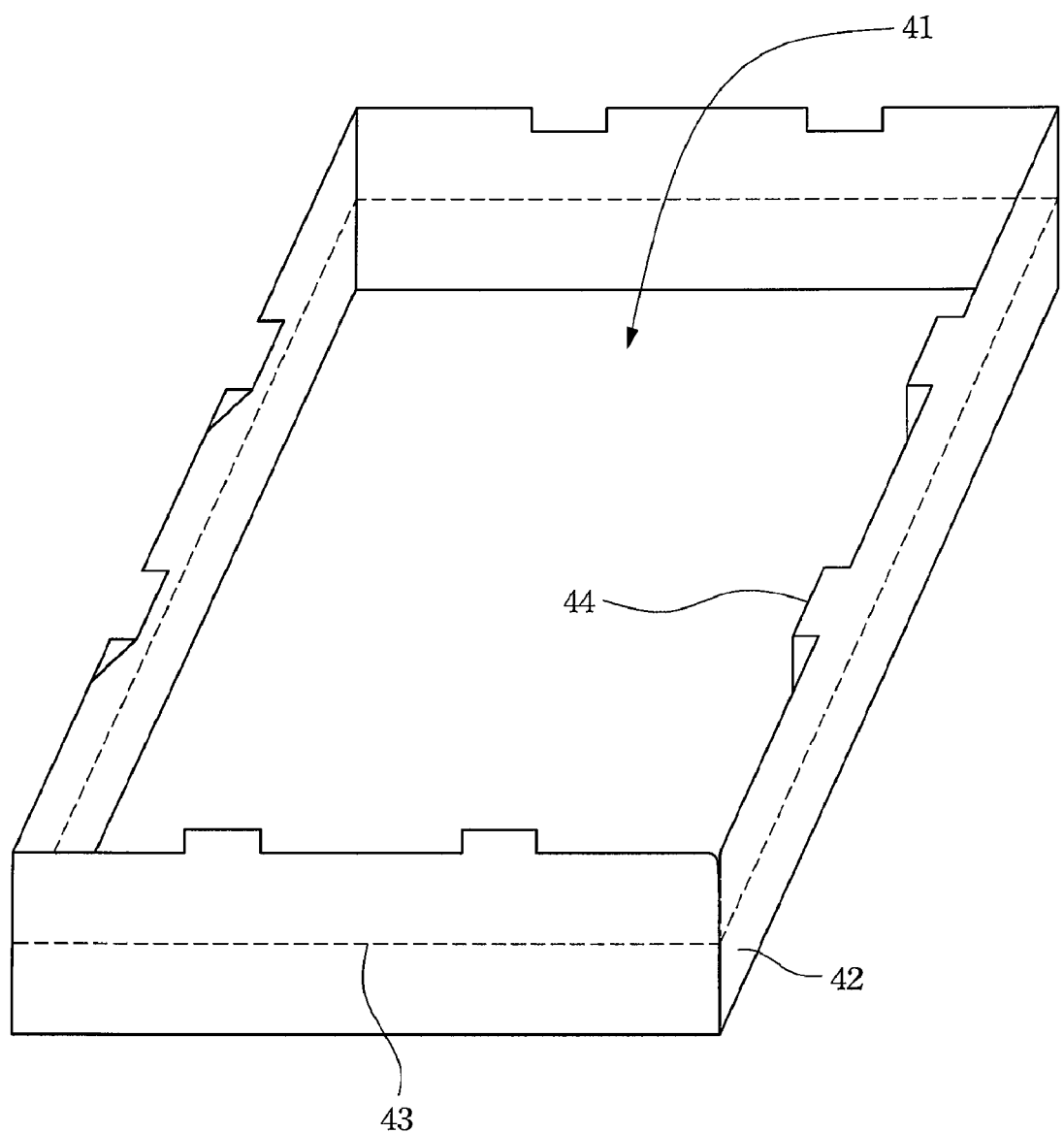
FIG. 8A and FIG. 8B illustrate a method for manufacturing the back plate of FIG. 1.
Figure 8B:
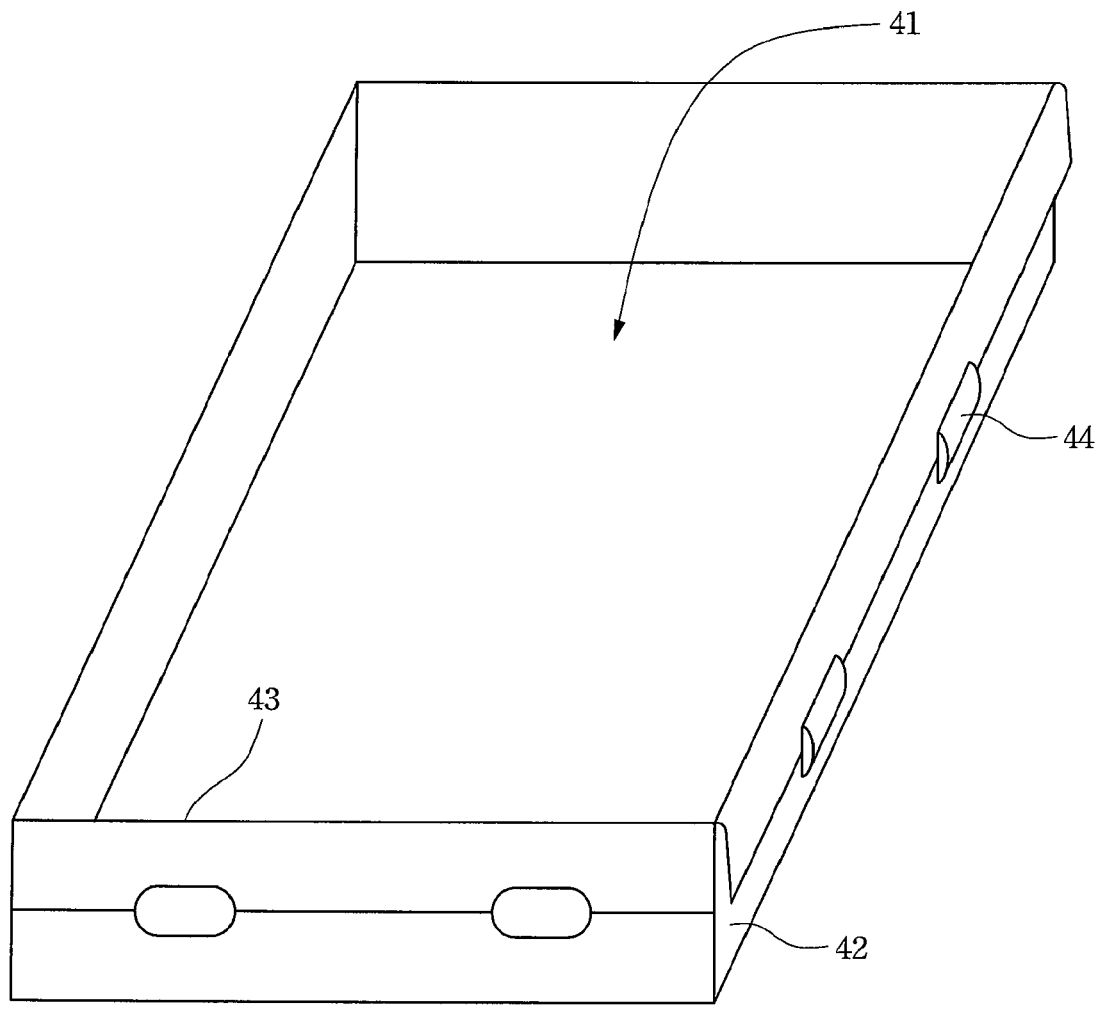

FIG. 8A and FIG. 8B illustrate a method for manufacturing the back plate 10 of FIG. 1. First, a protrusion 44 is formed on the inner surface of a half shell 42 (as shown in FIG. 8A). That is, the protrusion 44 protrudes inside the half shell 42, i.e. the container space 41, in this step. In the present embodiment, both the protrusion 44 and the half shell 42 may be made of metal.

Then, at least part of the half shell 42 is folded outwards along the fold line 43. After this step, the protrusion 44 faces outside of the half shell 42 to be a fastener, where the upper frame is coupled (as shown in FIG. 8B). In the present embodiment, the folding step may comprise mechanical stamping.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for manufacturing a back plate, the method comprising:
   providing a half shell having a container space, wherein the half shell comprises:
      a bottom plate; and
      a sidewall having a higher part and a lower part which is connected to the bottom plate, wherein the sidewall surrounds the container space;
   forming a protrusion on the higher part of the sidewall, wherein the protrusion protrudes towards the container space; and
   folding the higher part of the sidewall outwards such that the protrusion faces outside of the half shell.

2. The method of claim 1, wherein the folding step comprises mechanical stamping.

3. The method of claim 1, wherein the half shell is made of metal.

* * * * *